UNITED STATES PATENT OFFICE.

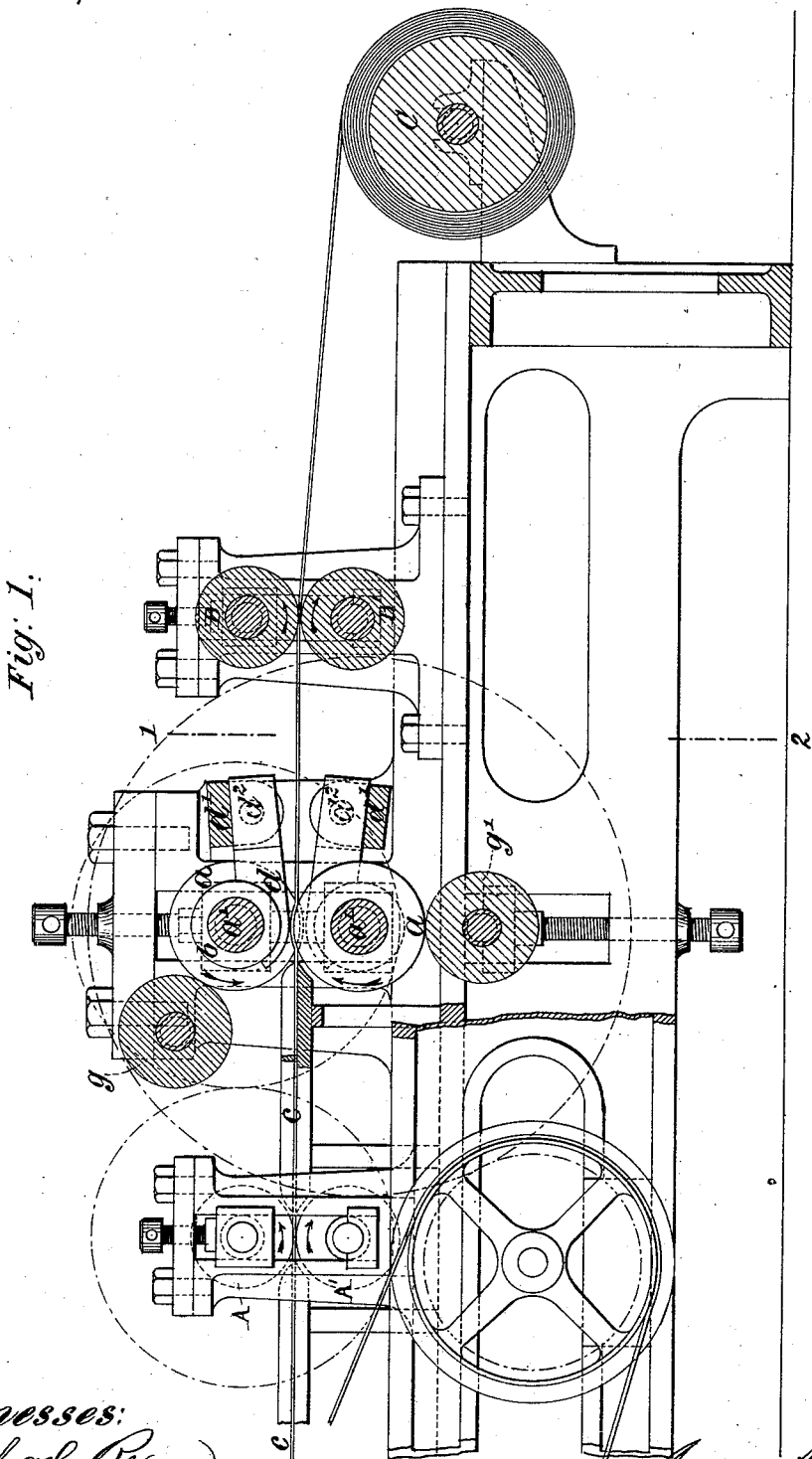

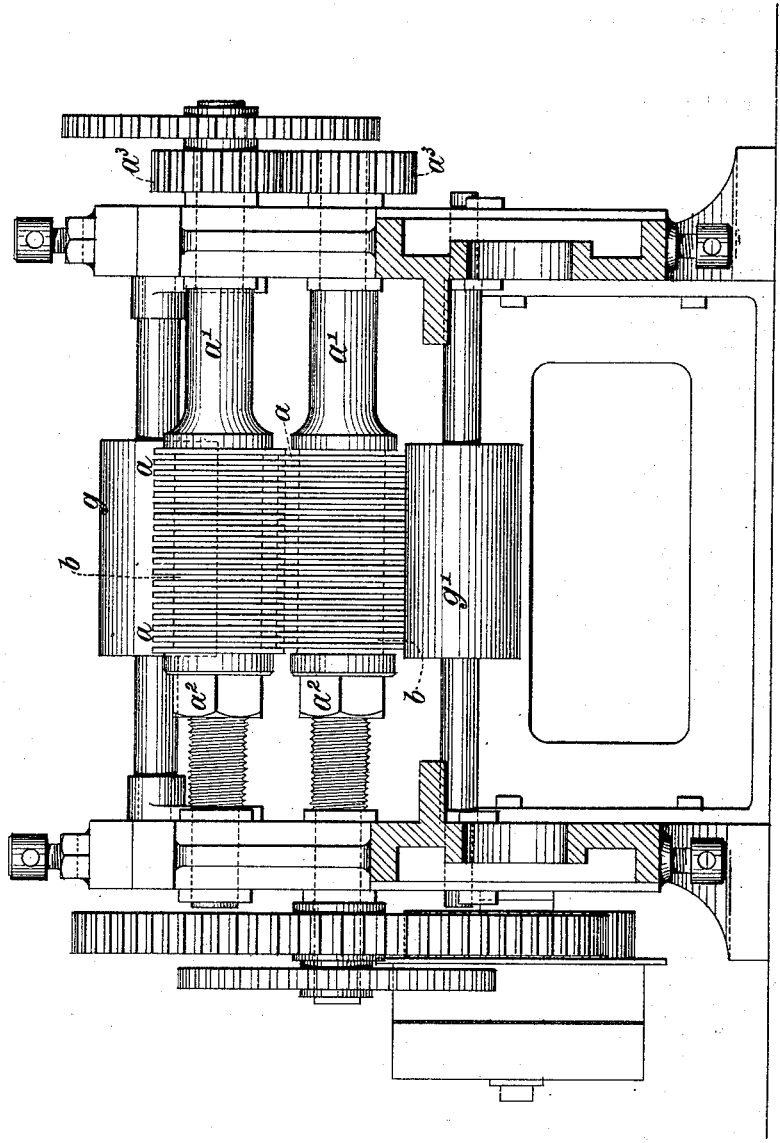

JAMES A. JAQUES, OF TOTTENHAM, ASSIGNOR OF ONE-HALF HIS RIGHT TO LOUIS STERNE, OF WESTMINSTER, ENGLAND.

IMPROVEMENT IN RUBBER-CUTTING MACHINES.

Specification forming part of Letters Patent No. 156,162, dated October 20, 1874; application filed May 29, 1874.

*To all whom it may concern:*

Be it known that I, JAMES ARCHIBALD JAQUES, of Tottenham, in the county of Middlesex, England, chemist, have invented certain Improvements in Rubber-Cutting Machines, of which the following is a specification:

My invention has for its object to improve upon that class of machines now employed for cutting sheet rubber into strips. Heretofore such machines have been constructed with a series of disks mounted upon spindles, in such a manner that the disks of one shaft mesh with the disks of the other, said disks being prevented from revolving on said shaft by means of a feather formed on the spindles. In such machines no provision has been made for retaining the disks at an equidistance apart; they have been free to slide on the same, and, when worn by meshing with each other, they have been adjusted by means of nuts arranged upon the ends of the shaft.

My invention consists of a series of disks having square cutting-edges mounted upon spindles, said spindles being arranged in such proximity to each other as to allow the disks of one spindle to mesh with the disks of the other, said disks on each spindle being prevented from revolving thereon by means of a spline or feather, while there is interposed between each disk a rigid metallic separating or gage plate, of a thickness equal to the thickness of the cutters, and of a diameter sufficient to support the sides of said disks at all times, especially during the cutting operation, so that said disks will be perfectly parallel with each other, and neither permitted to deviate from their true parallelism—a result which cannot be secured if the rigid separating or gage plates be omitted. The invention also relates to an organized machine for cutting sheets of rubber into threads; and it consists in a certain combination of parts, as will be hereinafter described.

In the accompanying drawing, Figure 1 is a longitudinal vertical section, representing the main working parts of a machine constructed according to my invention, for cutting sheets or wide bands of rubber into separate threads or filaments, so as to form a kind of warp. Fig. 2 is a transverse vertical section of the machine, taken in the line 1 2 of Fig. 1, and looking toward the left, but with some of the parts removed in order that the cutting-disks may be more clearly seen.

The cutters are formed of circular disks of steel, with square edges, and of the proper thickness, according to the size of thread it is desired to produce. Any number of these cutting-disks $a\ a$, according to the width of the sheet of rubber to be operated upon, are mounted upon shafts or spindles $a^1$, with rigid metallic separating or gage plates $b\ b$ of the same thickness as the cutters between them, so as to keep the cutting-disks $a\ a$ the proper distances apart, and support the same perfectly parallel with each other. Two of these spindles $a^1\ a^1$, with the cutting-disks $a$, and separating or gage plate $b$ on them, are screwed up tightly by jam-nuts $a^2$, Fig. 2, which are arranged together in such a manner that the projecting edges of one set of cutting-disks, $a$, will be made to gear or take into the spaces between the opposing set of disks, as shown at Fig. 2. The two spindles $a^1$ are to be geared together by means of toothed wheels $a^3$, and, therefore, made to rotate together either at the same or unequal speeds, according to the proportion of their toothed driving-wheels $a^3$.

From the above description, it will be understood that, if a sheet of rubber, $c$, Fig. 1, be fed forward by the front delivery rollers or drums A A' and the rear drawing-rollers B B', causing the sheet of rubber in a taut condition to pass between the two sets of rotating disks $a\ a$, it will be quickly divided into separate threads, and as the cutters $a$ always rotate continuously in the same direction, as indicated by the arrows in Fig. 1, the cutting operation will be continuous until the sheet of rubber is cut up or divided from end to end into separate threads, said threads being wound upon a suitable reel or roll, C, preferably supported in rear of the machine.

In order to discharge the divided threads of rubber from between the cutting-disks, there are a series of fingers, $d\ d$, consisting of metal plates of nearly the same thickness as the separating or gage plates $b\ b$. These finger-plates $d\ d$ are inserted between the disks $a\ a$, as shown at Fig. 1, and will thus prevent the threads from being carried round.

The disks, having square cutting-edges, and also the separating or gage plates, are ground with mathematical precision with a magnetic tool, so as to secure perfect accuracy.

A set of finger-plates is adapted to each of the set of cutting-disks, and they are secured on the bars $d^1\ d^1$ by means of tightening-screws $d^2$, separating-pieces being placed between the finger-plates, in order to preserve their proper distances apart.

In order to keep the square edges of the cutting-disks $a\ a$ in proper condition, steel rollers $g\ g'$ are made to bear with considerable pressure against their peripheries, as shown at Figs. 1 and 2, so as to break down any burr that may be formed on the edges of the disks $a\ a$ by continual working.

What I claim is—

1. The square-edged cutting-disks $a\ a$, mounted upon spindles $a^1\ a^1$, in combination with rigid separating or gage plates $b$, interposed between the disks, substantially as described, whereby the cutting-edges are equidistant apart during the operation of cutting, and the disks supported for the purpose of cutting sheets of rubber into separate threads, as set forth.

2. In combination with the square-edged cutting-disks $a\ a$ and rigid separating or gage plates interposed between said disks, the rollers $g\ g'$ for operating on the periphery of the disks to remove any burrs produced thereon, substantially as described.

3. The combination, in an organized machine for cutting a sheet of rubber into threads, of a series of cutting-disks, $a$, having square cutting-edges, mounted on spindles $a^1\ a^1$ to mesh with each other, the separating or gage plates for keeping and supporting said disks equidistant apart, the pressing-rollers $g\ g'$ for removing burrs, the delivery and drawing rollers A A' B B' for passing a sheet of rubber between the disks and a winding-reel, C, substantially as described, for the purpose specified.

London, May 14, 1874.

JAS. A. JAQUES.

Witnesses:
  H. K. WHITE,
  W. H. NASH,
      66 *Chancery Lane, London.*